(12) United States Patent
Aghemio Rodriguez

(10) Patent No.: US 9,206,493 B2
(45) Date of Patent: Dec. 8, 2015

(54) METHOD FOR LEACHING COPPER OXIDE, REPLACING SULFURIC ACID WITH A NON-POLLUTING ORGANIC LEACHING AGENT

(75) Inventor: Luis Alberto Aghemio Rodriguez, Talagante (CL)

(73) Assignee: PROKUMET SPA, Santiago (CL)

(*) Notice: Subject to any disclaimer, the term of this patent is extended or adjusted under 35 U.S.C. 154(b) by 204 days.

(21) Appl. No.: 13/992,376

(22) PCT Filed: Nov. 28, 2011

(86) PCT No.: PCT/CL2011/000072
§ 371 (c)(1),
(2), (4) Date: Sep. 9, 2013

(87) PCT Pub. No.: WO2012/075596
PCT Pub. Date: Jun. 14, 2012

(65) Prior Publication Data
US 2013/0333524 A1 Dec. 19, 2013

(30) Foreign Application Priority Data

Dec. 10, 2010 (CL) .................................. 1399-2010

(51) Int. Cl.
| | |
|---|---|
| *C25D 3/38* | (2006.01) |
| *C25C 1/12* | (2006.01) |
| *C22B 3/16* | (2006.01) |
| *C22B 15/00* | (2006.01) |
| *C22B 1/10* | (2006.01) |

(52) U.S. Cl.
CPC ............. *C22B 15/0067* (2013.01); *C22B 3/165* (2013.01); *C22B 15/0063* (2013.01); *C25C 1/12* (2013.01); *C25D 3/38* (2013.01)

(58) Field of Classification Search
CPC .......... C22B 3/165; C22B 15/067; C22B 1/14
See application file for complete search history.

(56) References Cited

U.S. PATENT DOCUMENTS

| | | | |
|---|---|---|---|
| 3,490,899 A | | 1/1970 | Krivsky et al. |
| 4,622,131 A | * | 11/1986 | Bresson et al. ................ 209/167 |
| 6,395,061 B1 | * | 5/2002 | Duyvesteyn et al. ........... 75/712 |

FOREIGN PATENT DOCUMENTS

| | | | |
|---|---|---|---|
| CN | 1198963 A | * | 11/1998 |
| GB | 1474944 A | * | 5/1977 |
| WO | 02/08473 A2 | | 1/2002 |
| WO | 2005/083132 A1 | | 9/2005 |

OTHER PUBLICATIONS

Shi et al. "Method for floatation of copper nickel sulfide material". CN 1198963 A published Nov. 18, 1998. Machine translation.*
Habbache et al. "Leaching of Copper Oxide with Different Acid Solutions". Chemical Engineering Journal. 152 (2009) pp. 503-508.*
Non-English Action dated Jul. 15, 2013 for Chilean Application No. 1399-2010 and an English translation.
Habbache, N. et al., "Leaching of copper oxide with different acid solutions", Chemical Engineering Journal 152, (2009), pp. 503-508.

* cited by examiner

*Primary Examiner* — George Wyszomierski
*Assistant Examiner* — Tima M McGuthry Banks
(74) *Attorney, Agent, or Firm* — Ladas & Parry LLP

(57) ABSTRACT

The invention relates to a method for leaching copper oxide without using sulfuric acid, comprising the following steps consisting in: impregnating the copper oxide using a non-polluting organic leaching agent consisting of an aqueous solution formed by tricarboxylic acid ($C_6H_8O_7$) combined with water in a mixture having an acidity varying between a pH of 1 and 5; obtaining copper citrate; and, optionally, again irrigating the copper oxide impregnated with the non-polluting organic leaching agent, thereby obtaining a more concentrated copper citrate.

20 Claims, No Drawings

METHOD FOR LEACHING COPPER OXIDE, REPLACING SULFURIC ACID WITH A NON-POLLUTING ORGANIC LEACHING AGENT

RELATED APPLICATION INFORMATION

This application is a 371 of International Application PCT/CL2011/000072 filed 28 Nov. 2011 entitled "Method For Leaching Copper Oxide, Replacing Sulfuric Acid With A Non-Polluting Organic Leaching Agent", which was published on 14 Jun. 2012, with International Publication Number WO 2012/075596 A1, and which claims priority from Chilean Patent Application No.: 1399-2010 filed 10 December, the contents of which are incorporated herein by reference.

FIELD OF THE INVENTION

The present invention relates with copper leaching, and in particular with an hydrometallurgical process for the leaching of copper oxide ores in order to produce copper cathodes, sheets or precipitates, process that uses an organic non contaminant leaching agent.

BACKGROUND

Copper leaching in the mining industry presents many complexities and inconveniences, both with respect to the processes employed and with respect to the effects generated by the same. More in particular, the industrialization of this process in the mining field has called for the use of sulphuric acid as leaching agent, thus generating a particularly harmful due to its high contaminating capacity. At the same time, said acid is especially hazardous for people that must carry out operations and work where the acid is used. Furthermore, its use does not allow to reuse again the water utilized in the process, thus generating additional costs and a larger contamination, due to its waste materials. In another aspect, the leaching method currently used in mining makes it impossible the efficient recovery of the copper mineral left in the leaching piles, rendering this process inefficient, and as indicated, with high associated costs. Thus, and considering what is known in the state of the art, it is possible to observe that copper leaching in the mining industry is complex, costly, highly contaminant and up to date, with inefficient results.

Currently, copper continues to experiment an important demand, which is considered to continue growing, not only due to the multiple fields wherein the metal can be used, but also due to its utilisation potential for various and continuous technological and industrial developments, in sectors such as electronics, computing, communications, pipe production, solar panel productions, automotive industry, energy and power transfer, among others, making copper one of the most required metals. Thus, it is really important to have efficient and effective processes for copper production regarding: lowering costs, avoid environment contamination, bring enhanced operation security and optimize its production capacity, which is of great importance for the mining industry and, in consequence, for the world economy.

Taking in account what has already been indicated, some of the processes that have been used up to date for copper ore leaching will be described:
 i) Ammonia leaching
 ii) Thiourea leaching
 iii) Use of sea water and Saltpeter
 iv) Leaching using acids
 v) Sulphuric acid and water leaching Several factors have caused that these processes do not reach an optimal standard in production and efficiency, notably, among others, their high implementation costs, operational complexity and high environmental impact. In fact, due to its highly contaminating capacity and its high toxicity, the ammonia leaching process has not been able to thrive successfully in the industry.

Leaching with thiourea, a product developed on the basis of organic substances mixed with sodium cyanide has not been consolidated either in the mining industry, as it is highly aggressive with the environment.

The leaching process using Saltpeter and sea water, on its turn, hasn't been used successfully due to the low purity of the copper liquor obtained, as it suffers from an excessive salt crystal formation.

In turn, the leaching using acids, pure or mixtures, for example hydrochloride acid, nitric acid, or a mixture thereof, also known as aqua regia, has been used to dissolve noble metals such as gold and silver, is extremely aggressive, toxic and highly expensive. It is only used at laboratory level. Finally, the leaching using sulphuric acid ($H_2SO_4$) with water ($H_2O$), corresponds to a satisfactory process whereby almost the whole of copper leaching is carried out in the mining industry. This procedure, that makes it possible to obtain copper cathodes starting with copper oxide ore, is initiated with grinding and classifying the ore from the mine, then moving it to leaching piles, ore that has previously been ground, classified and impregnated, piles that are irrigated with a sulphur acid solution, and water (with a controlled acidity that is determined depending on the characteristic mineralogy of the mining site and that usually with a pH between 1.5 and 3.0) thus producing soluble copper sulphate. Said acid leaches copper along with the other minerals occluded in the head ore, known as impurities. Once the residence time is finished in the leaching piles, the first result is an impure copper liquor, wherein iron and other minerals in suspension are present. This copper liquor is subjected to a process stage known as solvent extraction, that allows the purification and concentration of the copper liquor in an aqueous phase, that is then denominated rich solution. This solution, rich in copper is forwarded to accumulations tanks from which is pumped to an electro-deposition plant, where by using an electro-chemical process the metallic copper is deposited (cathodes) after a predefined residence time, thus obtaining a suitable weight to harvest, wash and commercialize them as high purity copper cathodes. Finally, once the leaching pile has finished its cycle, the pile is discarded.

There are several problems that can be observed for this process. First, and due to the use of sulphuric acid as a leaching agent, this process results highly toxic and contaminant. Second, the use of this acid calls for the implementation of machinery, devices, equipment, supplies and materials particularly resistant to acid attack, thereby highly expensive, considerably increasing the production costs. Third, the operation risks are high and the consequences in case of accident are particularly serious for operators and workers. Fourth, the solvent extraction step increases the accident risk due to the use of an extraction agent (comprising aldoximes and ketoximes, or similar elements) that mixed with liquid paraffin (or kerosene), generates toxic and flammable gases that create a permanent hazard in the workplace. As a matter of fact, this step on its own causes a set of complexities and inconveniences related, among others, with security, high investment costs (specially related to the extracting agent used), implementation and training, all of which, as it will be shown, can be avoided by the present invention. Fifth, the process currently used is inefficient from a production point of view due to the high percentage of material loss. As a matter of fact, and as indicated previously, once the leaching pile used in the process has finished its production cycle, it is discarded, thus losing the copper oxide ore left in it. This loss prevents the recovery of 100% of the mineral due to a lack of penetration of the sulphuric acid in the rocks, which cannot be re-ground because of the presence of free acid contained therein. Consequently, the discarded mineral in the leaching piles is carried to dumps, representing a loss of approximately 30% of the mineral contained in the pile, among which, in addition to occluded insoluble copper (copper sulphide), there are noble metals such as gold and silver, that can also be useful. Sixth, in addition to said loss, it is not possible to recover the water used in the process due to the build-up in ferric sulphate as a contaminant, and thus is discarded to a tailings dam with a free sulphuric acid content, with the impurities. Seventh, the lack of a possibility to recover said wasted materials, bears an important damage to the environment because the remaining sulphuric acid keeps impregnated in the abandoned mineral. Furthermore, and in accordance with the preceding description, along with this loss, other than diminishing the productivity of the process, it is highly contaminant and hazardous due to its potential spreading to the surrounding populations and along with the winds, the rain waters and the underground waters, affecting in this way the crops, the flora and fauna of the ecosystem and in general, all the environment. As mentioned before, this is the process with which the copper leaching is currently, and almost totally, carried out in the mining industry. As a consequence, the fact of this process, along with bearing high investment costs, is productively inefficient, operational hazardous, and deteriorates the environment, carries considerable problems to the copper leaching, and therefore, being able to rely on a system that allows rendering better and optimizing said process, has a particularly relevant industrial and economical importance.

Consequently, and as known in the state of the art, in the mining industry currently it does not exist a process that allows the leaching of a copper ore in an efficient, not hazardous and consequently does not deteriorate the environment. In other terms, the known processes for the leaching of copper in the mining industry bear a set of problems and inconveniences that cover various critical fields, but the solution of which is possible by means of the invention in this application.

The present invention solves all of the inconveniences previously described, invention that comprises a unique process wherein a specially developed copper leaching agent is used, agent composed by tricarboxylic acid ($C_6H_8O_7$) in combination with water ($H_2O$), in a ratio that permits an acidity between a pH of 1.0 and 5.0; leaching agent to which sodium benzoate ($C_6H_5COONa$) or (E211) can be added as preserving agent, which acts to inhibit micro organism proliferation, and which maximum ratio is between 0.05% and 1.00% of the specified solution.

Consequently, the process does not damage the environment, producing in the leaching process a copper citrate that, further more, is not corrosive. This characteristic is specially important because in producing copper citrate, the process allows the recovery of the water that has been used in the production process. Furthermore, by means of this method, the implementation costs are reduced because the materials used do not require an extreme resistance to highly corrosive products or elements, as it happens when sulphuric acid is used, because the proposed leaching agent, as the copper citrate produced, are not corrosive agents.

As a matter of fact, devices such as impulsion pumps, fluid transportation pipes, cut and control valves, electrolyte contention ponds, clothes and working supplies (such as coveralls, goggles or gas masks), accumulation tanks, floor toppings, roof covers and supporting structures—among others—must fulfill highly demanding characteristics in relation with acid resistance, thus leading to elevated investments costs, all of which is now avoided, and saved thanks to the process published in this application.

Likewise, this process implies a significant improvement in operational safety. As a matter of fact, due to its design and characteristics, toxic gases are not generated, and thus it is possible to walk freely by every place in the mining workplace. Furthermore, said improvement is also evident as for the absence of the risk of burning accident with acids that could affect the operators and general workers, making of this process one of the most reliable and safe for copper leaching in the mining industry. In turn, the elements, the design and the steps contemplated in the process of this application, along with the specific qualities of the leaching agent used, make possible carrying out a selective copper leaching. This characteristic is particularly relevant, because as it does not dissolve iron, it makes it possible to omit the solvent extraction step. Consequently, the procedure is capable of eliminating one of the steps that, up to now, and as indicated previously in this application, generates some of the more important inconveniences for copper leaching in the mining industry, all of which are solved because de copper citrate obtained without the presence of iron in this concentrated soluble state, allows the elimination of said step, making it possible to continue immediately after the leaching step to the electro-deposition step, thus solving the described problems, and allowing in turn the obtention of metallic copper cathodes in a more safe and efficient way with respect to all that is known in the mining industry.

In turn, the process described in the present application allows obtaining high levels of productive efficiency by means of the recovery of mineral already worn out/exhausted mineral of the leaching piles by using a re-grounding consisting in a humid grinding wherein the leaching agent previously indicated, which makes it possible to enhance by 30% or more the soluble copper production and to recover the noble metals (gold, silver and platinum), as well as the copper sulphates. Furthermore, the process of the present application makes it possible to optionally obtain, by means of a step subsequent to the leaching piles recovery, a copper precipitate, thus enlarging the range of possible products that can be obtained by means of this process.

Finally, and as another additional advantage, the process described in this application makes it possible in turn to recover the used process water, which in turn makes it possible not to use the tailings dams, that besides having a high cost, generate a high environmental impact.

DETAILED DESCRIPTION OF THE INVENTION

The previously described matters are possible by means of the invention subject of this application, that consists in an hydrometallurgical process for the leaching of copper oxide ores that allows the production of cathodes, sheets or copper precipitate, that uses an organic, non contaminant leaching agent, that comprises the following steps:

a) Leaching of copper oxide ore: after the ore has been moved from the mine, the process comprises the primary, secondary and tertiary grinding are carried out for its classification, mineral that is transported to an agglomeration step to be impregnated with an aqueous solution (or leaching solution) that consists of an aqueous solution composed by tricarboxylic acid ($C_6H_8O_7$) in combination with water ($H_2O$), in a mixture such that the acidity varies between a pH value of 1.0 and 5.0; to which sodium benzoate can be added ($C_6H_5COONa$) or (E211) as a preservation agent, that acts to inhibit the micro organism proliferation, its maximal incorporation varying between 0.05% and 1.00% of the weight of the described solution. Then the mineral, already impregnated, will be transported and stocked in piles—leaching piles—, which are irrigated with the aqueous solution (or leaching solution) previously specified. This irrigation will be carried out by means of a systematic administration of the leaching piles, consisting in the division or parceling of the piles in sectors, which will be irrigated sequentially with the leaching agent, thus allowing the obtention of a copper liquor that, by means of the properties of said leaching agent, will generate copper citrate. The obtained citrate, which in turn does not contain iron nor other contaminants in soluble state, is used along with the leaching agent to irrigate the leaching pile—as already described, by sectors and sequentially—, thus increasing the soluble copper concentration to a concentration near 50 grams per liter. Said irrigation will last until the wearing out of the mineral from the leaching pile, which irrigation time will depend on the leaching kinetics of each mineral. In this way, the result obtained will correspond to a soluble concentrated copper citrate that is electro-deposited, making it possible to carry on immediately the electro-deposition step for the production of copper cathodes or sheets, or other derived products based on copper. Consequently, the process allows in the same way to omit the solvent extraction step, because, on one hand, the copper citrate obtained does not have iron (nor other contaminants), that is not dissolved in the leaching step, and, on the other, because it is possible to reach soluble copper concentrations levels suitable for the electro-deposition.

b) Electro-deposition: step subsequent to the preceding step and where the obtained copper citrate is conducted and poured, by means of a controlled flow, in electro-deposition pools, that contain anodes and cathodes fed by a continuous voltage varying between 0.1 y 7.0 Volts, at a current density varying between 5.0 and 300.0 amperes/square meter, whose residence time will depend on the thickness of the cathode to be obtained. Consequently, the process makes it possible to obtain copper cathodes or sheets starting with copper citrate. Likewise, the poor electrolyte, this is, the one that was electro-deposited, can also be used, by means of a recirculation, to irrigate, along with the leaching agent already described, the leaching piles, contributing by this means to the soluble copper concentration.

c) Recovery of the leaching piles: step that allows the recovery of the ore already consumed from the leaching piles by means of a second grinding, comprising a humid grinding wherein the leaching agent previously described is used, with mechanic agitation for a controlled residence time, defined in accordance to the leaching kinetics of each mineral. This generates a pulp that allows to leach the nucleus of said mineral, that once filtrated makes possible, on one hand, to obtain additional copper liquor and on the other hand recover the noble metals (gold, silver and platinum), as well as the copper sulphate, that could still be contained, by means of concentration and flotation process.

d) Copper precipitate: optional step, subsequent to the recovery of the leaching piles, in which the obtained copper citrate is conducted and poured in an accumulation pool to which iron +1 is added as clean scrap. This element acts as a catalyser, attracting the soluble copper ion, after a residence time that will depend both on the copper citrate concentration and on the contact surface of the iron +1, all of which makes it possible to obtain a copper cement or precipitate of high purity (a law over 75% of copper).

EXAMPLE

A leaching experience according to the process object of this application is carried out using a copper oxide ore with the following law: Total Cu (1.24%); Cu Ox (1.07%); Au (0.02 g/ton); Ag (13 g/ton); and a size mesh—¼", obtaining the following results:

TABLE 1

Copper dissolution kinetics

| Sample identification | Sampling (Hr) | analyzed Cu in solution (g/L) | | | Cu in the solution (g) | | | Soluble Cu w/r to Head Cu (%) | | |
|---|---|---|---|---|---|---|---|---|---|---|
| | | pH 1.8 | pH 2.0 | pH 2.5 | pH 1.8 | pH 2.0 | pH 2.5 | pH 1.8 | pH 2.0 | pH 2.5 |
| M-LAR-2; 0 hour | 0 | — | — | — | — | — | — | — | — | — |
| M-LAR-2; 2 hours | 2 | 3.72 | 3.77 | 1.66 | 8.43 | 8.49 | 4.35 | 69.5 | 65.8 | 36.7 |
| M-LAR-2; 4 hours | 4 | 4.27 | 4.09 | 1.68 | 10.05 | 9.40 | 4.60 | 82.9 | 72.9 | 43.0 |
| M-LAR-2; 6 hours | 6 | 4.19 | 4.38 | 2.26 | 10.30 | 10.26 | 6.32 | 87.0 | 79.5 | 48.0 |
| M-LAR-2; 8 hours | 8 | 4.32 | 4.37 | 2.00 | 11.01 | 10.45 | 6.32 | 90.8 | 81.1 | 53.3 |
| M-LAR-2; 24 hours | 24 | 4.24 | 4.68 | 2.32 | 11.26 | 11.37 | 6.99 | 92.8 | 88.2 | 59.0 |
| M-LAR-2; 48 hours | 48 | 3.89 | 4.66 | 1.82 | 11.26 | 11.56 | 6.99 | 92.8 | 89.6 | 59.0 |
| M-LAR-2; 54 hours | 54 | 3.53 | 4.67 | 1.68 | 11.26 | 11.82 | 6.99 | 92.8 | 91.6 | 59.0 |

TABLE 2

Iron dissolution kinetics

| Sample identification | Sampling (Hr) | analyzed Fe in solution (g/L) | | | Fe in the solution (g) | | | Soluble Fe w/r to Head Cu (%) | | |
|---|---|---|---|---|---|---|---|---|---|---|
| | | pH 1.8 | pH 2.0 | pH 2.5 | pH 1.8 | pH 2.0 | pH 2.5 | pH 1.8 | pH 2.0 | pH 2.5 |
| M-LAR-2; 0 hour | 0 | — | — | — | — | — | — | — | — | — |
| M-LAR-2; 2 hours | 2 | 0.18 | 0.20 | 0.08 | 0.41 | 0.45 | 0.21 | 0.8 | 0.9 | 0.4 |
| M-LAR-2; 4 hours | 4 | 0.24 | 0.31 | 0.13 | 0.57 | 0.73 | 0.36 | 1.1 | 1.4 | 0.7 |

TABLE 2-continued

Iron dissolution kinetics

| Sample identification | Sampling (Hr) | analyzed Fe in solution (g/L) | | | Fe in the solution (g) | | | Soluble Fe w/r to Head Cu (%) | | |
|---|---|---|---|---|---|---|---|---|---|---|
| | | pH 1.8 | pH 2.0 | pH 2.5 | pH 1.8 | pH 2.0 | pH 2.5 | pH 1.8 | pH 2.0 | pH 2.5 |
| M-LAR-2; 6 hours | 6 | 0.28 | 0.31 | 0.17 | 0.70 | 0.77 | 0.47 | 1.3 | 1.5 | 0.9 |
| M-LAR-2; 8 hours | 8 | 0.40 | 0.41 | 0.20 | 1.01 | 1.05 | 0.58 | 1.9 | 2.0 | 1.1 |
| M-LAR-2; 24 hours | 24 | 0.72 | 0.66 | 0.44 | 1.80 | 1.68 | 1.24 | 3.4 | 3.2 | 2.3 |
| M-LAR-2; 48 hours | 48 | 1.06 | 1.11 | 0.59 | 2.68 | 2.78 | 1.70 | 5.1 | 5.3 | 3.2 |
| M-LAR-2; 54 hours | 54 | 1.08 | 1.21 | 0.67 | 2.88 | 3.18 | 1.99 | 5.5 | 5.3 | 3.7 |

TABLE 3 pH and potential variation

| Agitating time (Hr) | pH 1.8 | | | | pH 2.0 | | | | pH 2.5 | | | |
|---|---|---|---|---|---|---|---|---|---|---|---|---|
| | Initial pH | Adjusted pH | Initial eH | Adjusted eH | Initial pH | Adjusted pH | Initial eH | Adjusted eH | Initial pH | Adjusted pH | Initial eH | Adjusted eH |
| 0 | 7.7 | 1.8 | 289 | 324 | 7.6 | 2.0 | 285 | 348 | 7.4 | 2.5 | 285 | 375 |
| 2 | 2.0 | 1.9 | 273 | 290 | 2.3 | 2.1 | 226 | 243 | 2.6 | 2.5 | 238 | 253 |
| 4 | 2.0 | 1.8 | 288 | 290 | 2.3 | 2.0 | 259 | 284 | 2.6 | 2.5 | 258 | 267 |
| 6 | 1.9 | 1.8 | 307 | 309 | 2.1 | 2.0 | 277 | 289 | 2.6 | 2.5 | 264 | 272 |
| 8 | 1.8 | 1.7 | 299 | 311 | 2.1 | 2.0 | 283 | 296 | 2.5 | 2.5 | 266 | 277 |
| 24 | 1.8 | 1.8 | 285 | 285 | 1.9 | 1.9 | 273 | 273 | 2.3 | 2.3 | 251 | 251 |
| 48 | 1.8 | 1.8 | 292 | 292 | 1.9 | 1.9 | 279 | 279 | 2.3 | 2.3 | 254 | 254 |
| 54 | 1.8 | 1.8 | 297 | 297 | 1.9 | 1.9 | 279 | 279 | 2.3 | 2.3 | 256 | 256 |

Thus, by means of the different test carried out, it is possible to arrive to the following conclusions:

1—Table No 1, shows the copper dissolution kinetics carried out using the process subject of this application, allows reaching copper dissolution levels similar to those with sulphuric acid leaching (closer to 94% of the total copper at a pH value of 1.8).

2—Likewise, Table No 1 shows that for the tested conditions, the maximal copper dissolution at pH 2 is obtained approximately at 10 hours of agitation.

3—Table No 2, shows the iron dissolution kinetic, carried out according to the procedure described in this application, dissolves approximately 5% of the iron contained in the sample, the concentration on iron in the copper rich solution closer to de 1 g/l of iron. Under similar experimental conditions, the iron rich concentration in the copper rich solution is equal to 4 g/l.

4—Table No 3, where the pH and potential for the electro-deposition shows that, for the three indicated pH values, namely pH 1.8; pH 2.0 and pH 2.5; the copper citrate obtained using the process described in this application is electro-deposited.

The invention claimed is:

1. A hydrometallurgical process for leaching copper oxide ore comprising the steps of:
   a) impregnating ground copper oxide ore with a leaching agent that consists of an aqueous solution composed of tricarboxylic acid ($C_6H_8O_7$) and water ($H_2O$), wherein the acidity of the aqueous solution is between a pH value of 1.0 and 5.0;
   b) forming leaching piles with the impregnated ore and irrigating the leaching piles with the leaching agent to obtain copper citrate; and
   c) electro-depositing the copper citrate by pouring the copper citrate into electro-deposition pools which contain anodes and cathodes fed with a continuous voltage varying between 0.1 and 7.0 Volts at a current density varying between 5.0 and 300.0 amperes per square meter.

2. The process according to claim 1, wherein the copper citrate obtained in step b) is used with the leaching agent to irrigate the leaching piles.

3. The process according to claim 1, wherein the copper citrate obtained in step b) is a concentrated soluble copper citrate.

4. The process according to claim 1, wherein sodium benzoate ($C_6H_5COONa$) is added as a preserving agent to inhibit micro organism proliferation,
   wherein a maximum amount of the preserving agent is between 0.05% and 1.00% of the volume of the aqueous solution of the leaching agent.

5. The process according to claim 1, wherein after step c), copper citrate that has not been electro-deposited is recirculated with the leaching agent to irrigate the leaching piles.

6. The process according to claim 1, further comprising grinding the leaching piles by a wet grinding and applying mechanical stirring to generate a pulp.

7. The process according to claim 1, further comprising filtering the pulp to recover one or more of copper citrate liquor, noble metals, and copper sulfate.

8. The process according to claim 7, wherein the copper citrate liquor is emptied into a buildup pool where iron is added to obtain precipitated copper.

9. The process according to claim 7, wherein the noble metals are gold, silver, or platinum.

10. A method for leaching copper oxide ore without using sulfuric acid comprising the steps of:
    a) impregnating ground copper oxide ore with an organic leaching agent consisting of an aqueous solution comprising tricarboxylic acid ($C_6H_8O_7$) in combination with water ($H_2O$), wherein the acidity of the aqueous solution is between a pH of 1.0 and 5.0,
    b) forming leaching piles with the impregnated ore, and c) irrigating the leaching piles with the organic leaching agent to obtain copper citrate.

11. The method of claim 10 further comprising electro-depositing the copper citrate,
   wherein the copper citrate is poured by a controlled flow to electro-depositing pools,
   wherein the pools contain anodes and cathodes fed by a continuous voltage varying between 0.1 and 7.0 Volts at a current density varying between 5.0 and 300.0 amperes per square meter.

12. The method of claim 10, further comprising grinding the leaching piles by a wet grinding and applying mechanical stirring to generate a pulp.

13. The method of claim 12, further comprising filtering the pulp to recover one or more of copper citrate liquor, noble metals, and copper sulfate.

14. The method of claim 13, wherein the copper citrate liquor is emptied into a buildup pool where iron is added to obtain precipitated copper.

15. The method of claim 14, wherein the iron is from clean scrap.

16. The method of claim 13, wherein the noble metals are gold, silver, or platinum.

17. The method of claim 10, wherein the copper citrate obtained in step c) is added to the leaching piles for irrigating the leaching piles until the leaching piles are exhausted.

18. The method of claim 10, wherein sodium benzoate ($C_7H_5COONa$) is added as a preservative to inhibit microorganism proliferation.

19. The method of claim 18, wherein the sodium benzoate is added at concentrations between 0.05% and 1.00% of the volume of the aqueous solution of the leaching agent.

20. A method for leaching copper oxide ore without using sulfuric acid comprising the steps of:
   a) impregnating ground copper oxide ore with an organic leaching agent consisting of an aqueous solution comprising tricarboxylic acid ($C_6H_8O_7$) in combination with water ($H_2O$), wherein the acidity of the aqueous solution is between a pH of 1.0 and 5.0,
   b) forming leaching piles with the impregnated ore,
   c) adding the leaching agent to the leaching piles, obtaining copper citrate, re-impregnating the leaching piles with the leaching agent, grinding the leaching piles by a wet grinding, and applying mechanical stirring to generate a pulp, and
   d) filtering the pulp to recover one or more of copper citrate liquor, noble metals, and copper sulfate.

* * * * *